(12) United States Patent
Kusumoto (10) Patent No.: US 10,837,543 B2
(45) Date of Patent: Nov. 17, 2020

(54) ROBOT, GEAR DEVICE, AND MANUFACTURING METHOD OF GEAR DEVICE

(71) Applicant: Seiko Epson Corporation, Tokyo (JP)

(72) Inventor: Hiroyuki Kusumoto, Okaya (JP)

(73) Assignee: Seiko Epson Corporation (JP)

( * ) Notice: Subject to any disclaimer, the term of this patent is extended or adjusted under 35 U.S.C. 154(b) by 665 days.

(21) Appl. No.: 15/707,193

(22) Filed: Sep. 18, 2017

(65) Prior Publication Data
US 2018/0080543 A1   Mar. 22, 2018

(30) Foreign Application Priority Data

Sep. 21, 2016 (JP) .................................. 2016-184663

(51) Int. Cl.
*F16H 49/00* (2006.01)
*F16H 57/12* (2006.01)
*F16H 57/04* (2010.01)

(52) U.S. Cl.
CPC ....... *F16H 57/0476* (2013.01); *F16H 49/001* (2013.01); *F16H 57/041* (2013.01); *F16H 57/0464* (2013.01); *F16H 57/12* (2013.01)

(58) Field of Classification Search
CPC .............................. F16H 49/001; F16H 57/12
USPC .......................................................... 74/640
See application file for complete search history.

(56) References Cited

U.S. PATENT DOCUMENTS

| | | | | | |
|---|---|---|---|---|---|
| 3,730,016 | A | * | 5/1973 | Miller | F16H 25/229 74/424.94 |
| 4,041,795 | A | * | 8/1977 | Rekoff, Jr. | F16H 25/20 74/89.27 |
| 4,482,828 | A | * | 11/1984 | Vergues | H02K 7/06 310/80 |
| 4,557,153 | A | * | 12/1985 | Ulbing | F16H 25/20 74/2 |
| 4,794,810 | A | * | 1/1989 | Parsons | F16H 25/2295 74/424.94 |
| 4,848,184 | A | * | 7/1989 | Ulbing | F16H 25/2409 74/640 |

(Continued)

FOREIGN PATENT DOCUMENTS

JP   60-065451 U   5/1985
JP   60-129516 U   8/1985
(Continued)

*Primary Examiner* — Ha Dinh Ho
(74) *Attorney, Agent, or Firm* — Harness, Dickey & Pierce, P.L.C.

(57) ABSTRACT

A robot includes a gear device that has a first surface and a second surface which are in a tubular shape around an axis, are disposed inside and outside of each other, and repeatedly come into contact with and separate away from each other with operation of the gear device. The first surface has a first recessed portion and a first projection portion, which extend in a direction having a circumferential direction component around the axis and configure a first uneven pattern, by being alternately arranged in a direction along the axis. The second surface has a second recessed portion and a second projection portion, which extend in the direction having the circumferential direction component around the axis and configure a second uneven pattern that is different from the first uneven pattern, by being alternately arranged in the direction along the axis.

8 Claims, 9 Drawing Sheets

(56) References Cited

U.S. PATENT DOCUMENTS 4,854,189 A * 8/1989 Ulbing ................ F16H 25/2409
74/640
2002/0178861 A1 12/2002 Kobayashi

FOREIGN PATENT DOCUMENTS

| JP | 62-132068 A | 6/1987 |
| JP | 02-087152 U | 7/1990 |
| JP | 02-087153 U | 7/1990 |
| JP | 2002-349681 A | 12/2002 |
| JP | 2006-017218 A | 1/2006 |
| JP | 2006-077856 A | 3/2006 |

\* cited by examiner

ROBOT, GEAR DEVICE, AND MANUFACTURING METHOD OF GEAR DEVICE

BACKGROUND

1. Technical Field

The present invention relates to a robot, a gear device, and a manufacturing method of a gear device.

2. Related Art

In a robot that includes a robot arm which is configured so as to have at least one arm, for example, a joint portion of the robot arm is driven by a motor but driving force from the motor is decelerated by a decelerator in general. For example, a gear device, such as a wave gear device disclosed in JP-A-2002-349681, is known as such a decelerator.

The wave gear device disclosed in JP-A-2002-349681 includes a rigid internal gear that is in an annular shape, a flexible external gear that is in an annular shape, and a wave generator that partially meshes the external gear with the internal gear in a radial direction and moves the meshing position in a circumferential direction. In addition, in order to lubricate a friction-contact portion of the external gear and the wave generator, a solid lubricant is fixed to a portion of an inner circumferential surface of the external gear, which is in the vicinity of the contact portion.

In the related art, there is a problem that lubrication of the friction-contact portion of the external gear and the wave generator is insufficient and burning and wear are likely to occur relatively early in a case where a gear device, such as the wave gear device disclosed in JP-A-2002-349681 is used in a robot.

SUMMARY

An advantage of some aspects of the invention is to provide a robot, which can lengthen the life of a gear device, the gear device, and a manufacturing method of a gear device.

The advantage can be achieved by the following configurations.

A robot according to an aspect of the invention includes a first member, a second member that is provided so as to be movable around the first member, and a gear device that transmits driving force from one of the first member and the second member to the other. The gear device includes a first surface and a second surface that are in a tubular shape around an axis, are disposed inside and outside of each other, and repeatedly come into contact with and separate away from each other with operation of the gear device. The first surface has a first recessed portion and a first projection portion that extend in a direction having a circumferential direction component around the axis and configure a first uneven pattern by being alternately arranged in a direction along the axis. The second surface has a second recessed portion and a second projection portion that extend in the direction having the circumferential direction component around the axis and configure a second uneven pattern, which is different from the first uneven pattern, by being alternately arranged in the direction along the axis.

According to such a robot, since the first uneven pattern and the second uneven pattern are different from each other, the entry of the first projection portion into the second recessed portion and the entry of the second projection portion into the first recessed portion can be reduced when the first surface and the second surface repeatedly come into contact with and separate away from each other. For this reason, the spill of a lubricant from the first recessed portion and from the second recessed portion can be reduced, and good lubricity attributable to a lubricant between the first surface and the second surface can be maintained in the long term. As a result, the life of the gear device can be lengthened.

In the robot according to the aspect of the invention, it is preferable that at least one of a direction in which the first recessed portion or the first projection portion extends and a direction in which the second recessed portion or the second projection portion extends includes a direction component along the axis.

In such a case, when the first projection portion enters the second recessed portion or the second projection portion enters the first recessed portion, a lubricant inside the first recessed portion or the second recessed portion is likely to spill in an axis direction of the first surface or the second surface and lubricity attributable to a lubricant between the first surface and the second surface is impaired early. Therefore, when the invention is applied to such a case, the effect thereof becomes conspicuous.

In the robot according to the aspect of the invention, it is preferable that at least one of the first recessed portion and the second recessed portion extends along a spiral.

In such a case, when the invention is applied, by reducing the entry of the first projection portion into the second recessed portion and the entry of the second projection portion into the first recessed portion, there is not only an advantage of reducing the spill of a lubricant from the first recessed portion and from the second recessed portion but also an advantage, in which a lubricant is easily introduced between the first surface and the second surface through the first recessed portion or the second recessed portion.

In the robot according to the aspect of the invention, it is preferable that the gear device includes an internal gear, a flexible external gear that partially meshes with the internal gear, and a wave generator that deflects the external gear and moves a position where the internal gear and the external gear are meshed with each other in a circumferential direction, an inner circumferential surface of the external gear is the first surface, and an outer circumferential surface of the wave generator is the second surface.

In such a gear device (wave gear device), the inner circumferential surface (first surface) of the external gear deforms with the rotation of the wave generator and repeatedly comes into contact with and separates away from the outer circumferential surface (second surface) of the wave generator. Since it is necessary to make such an external gear thin, the external gear is likely to be damaged when lubricity attributable to a lubricant declines. Therefore, when the invention is applied to such a gear device, the effect of the invention becomes conspicuous.

A gear device according to an aspect of the invention includes a first surface and a second surface that are in a tubular shape around an axis, are disposed inside and outside of each other, and repeatedly come into contact with and separate away from each other with operation. The first surface has a first recessed portion and a first projection portion that extend in a direction having a circumferential direction component around the axis and configure a first uneven pattern by being alternately arranged in a direction along the axis. The second surface has a second recessed portion and a second projection portion that extend in the direction having the circumferential direction component around the axis and configure a second uneven pattern, which is different from the first uneven pattern, by being alternately arranged in the direction along the axis.

According to such a gear device, since the first uneven pattern and the second uneven pattern are different from each other, the entry of the first projection portion into the second recessed portion and the entry of the second projection portion into the first recessed portion can be reduced when the first surface and the second surface repeatedly come into contact with and separate away from each other. For this reason, the spill of a lubricant from the first recessed portion and from the second recessed portion can be reduced, and good lubricity attributable to a lubricant between the first surface and the second surface can be maintained in the long term. As a result, the life of the gear device can be lengthened.

In the gear device according to the aspect of the invention, it is preferable that the first recessed portion or the first projection portion has a portion extending along a spiral having a first pitch, and the second recessed portion or the second projection portion has a portion extending along a spiral having a second pitch, which is different from the first pitch.

With this configuration, the first uneven pattern and the second uneven pattern that are different from each other can be easily realized.

In the gear device according to the aspect of the invention, it is preferable that the first recessed portion or the first projection portion has a portion extending along a spiral, and the second recessed portion or the second projection portion has a portion extending along a spiral in an orientation opposite to the orientation of the first recessed portion or the first projection portion.

With this configuration, the first uneven pattern and the second uneven pattern that are different from each other can be easily realized.

A manufacturing method of a gear device according to an aspect of the invention is a manufacturing method of a gear device that includes a tubular first surface and a tubular second surface which are disposed inside and outside of each other and repeatedly come into contact with and separate away from each other with operation. The manufacturing method of a gear device includes forming the first surface which has a first recessed portion and a first projection portion, which extend in a direction having a circumferential direction component around a first axis and configure a first uneven pattern, by being alternately arranged in a direction along the first axis, and the second surface that has a second recessed portion and a second projection portion, which extend in a direction having a circumferential direction component around a second axis and configure a second uneven pattern that is different from the first uneven pattern, by being alternately arranged in a direction along the second axis, and disposing the first surface and the second surface inside and outside of each other.

According to such a manufacturing method of a gear device, a gear device with a long life can be manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a gear device, and a manufacturing method of a gear device according to the invention will be described in detail based on preferable embodiments illustrated in the accompanying drawings.

1. Robot

First, an embodiment of a robot according to the invention will be described.

Figure 1:
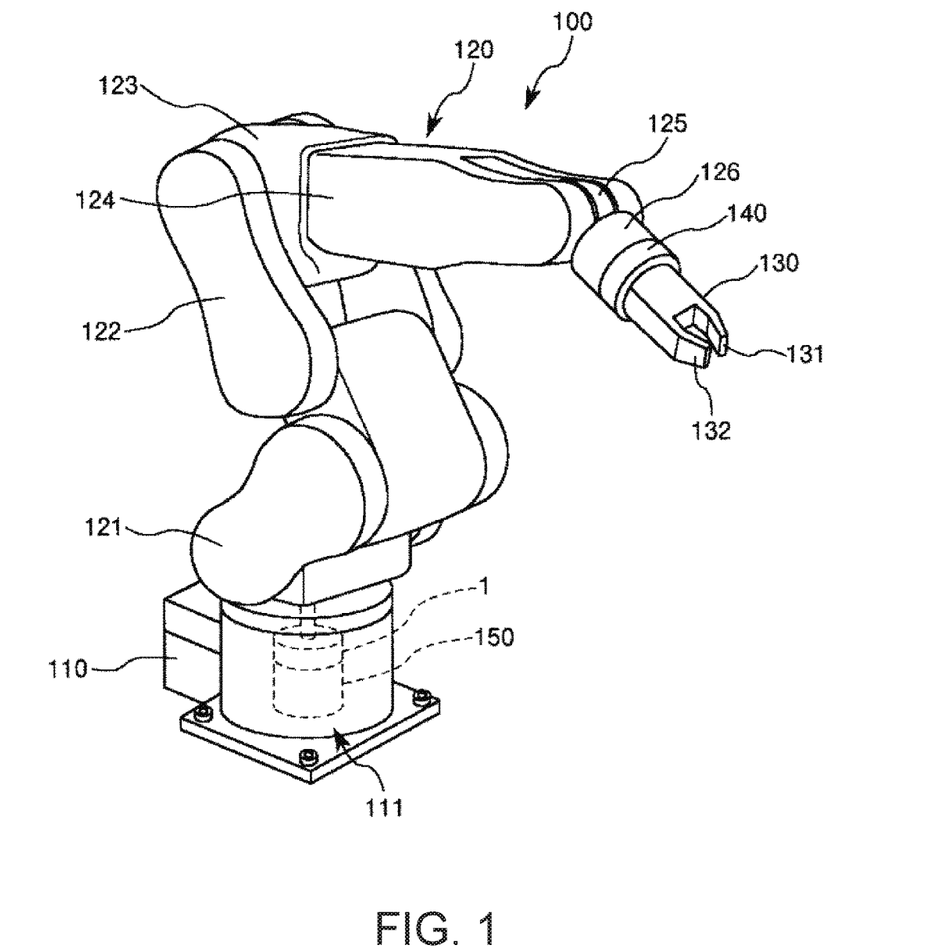
FIG. 1 is a view illustrating a schematic configuration of an embodiment of a robot according to the invention.

FIG. 1 is a view illustrating a schematic configuration of the embodiment of a robot according to the invention.

A robot 100 illustrated in FIG. 1 can perform work of feeding, removing, transporting, and assembling a precision apparatus and components (target objects) that configure the precision apparatus.

The robot 100 is a six-axis vertical multi-joint robot, and has a base 111, a robot arm 120 connected to the base 111, and a force detector 140 and a hand 130, which are provided on a tip portion of the robot arm 120. In addition, the robot 100 has a control device 110 that controls a plurality of drive sources (including a motor 150 and a gear device 1) that generate motive power to drive the robot arm 120.

The base 111 is a portion for mounting the robot 100 on any mounting point. The mounting point of the base 111 is not particularly limited, and may include, for example, a floor, a wall, a ceiling, and a movable carriage.

The robot arm 120 has a first arm 121 (arm), a second arm 122 (arm), a third arm 123 (arm), a fourth arm 124 (arm), a fifth arm 125 (arm), and a sixth arm 126 (arm), and the arms are connected in this order from a base end side to a tip side. The first arm 121 is connected to the base 111. The hand 130 (end effector) that grasps, for example, various types of components is detachably mounted on a tip of the sixth arm 126. The hand 130 has two fingers 131 and 132, and for example, various types of components can be grasped by the fingers 131 and 132.

A drive source that has the motor 150, such as a servomotor which drives the first arm 121, and the gear device (decelerator) are provided in the base 111. In addition, although not illustrated, a plurality of drive sources, each of which has a motor and a decelerator, are provided in each of the arms 121 to 126. Each drive source is controlled by the control device 110.

In such a robot 100, the gear device 1 transmits driving force from one of the base 111 (first member) and the first arm 121 (second member) to the other. More specifically, the gear device 1 transmits driving force to move the first arm 121 around the base 111 from a base 111 side to a first arm 121 side. At this time, by the gear device 1 functioning as a decelerator, the driving force can be decelerated and the first arm 121 can be moved around the base 111. "Moving around" refers to movement around a certain center point in both directions, including one direction and the opposite direction, and refers to rotating around a certain center point.

As described above, the robot 100 includes the base 111, which is the "first member", the first arm 121, which is the "second member" provided so as to be movable around the base 111, and the gear device 1 that transmits driving force from one of the base 111 (first member) and the first arm 121 (second member) to the other. Any number of arms sequentially selected from the first arm 121 side, out of the second to sixth arms 122 to 126, may be considered as the "second member". That is, it can be said that a structure formed of the first arm 121 and any number of arms sequentially selected from the first arm 121 side, out of the second to sixth arms 122 to 126, is the "second member". For example, it can be said that a structure formed of the first and second arms 121 and 122 is the "second member", or it can be said that the entire robot arm 120 is the "second member". In addition, the "second member" may include the hand 130. That is, it can be said that a structure formed of the robot arm 120 and the hand 130 is the "second member".

By the robot 100 described above including the gear device 1 described later, the life of a lubricant used in the gear device 1 can be effectively improved.

2. Gear Device

Hereinafter, an embodiment of the gear device according to the invention will be described.

First Embodiment

Figure 2:
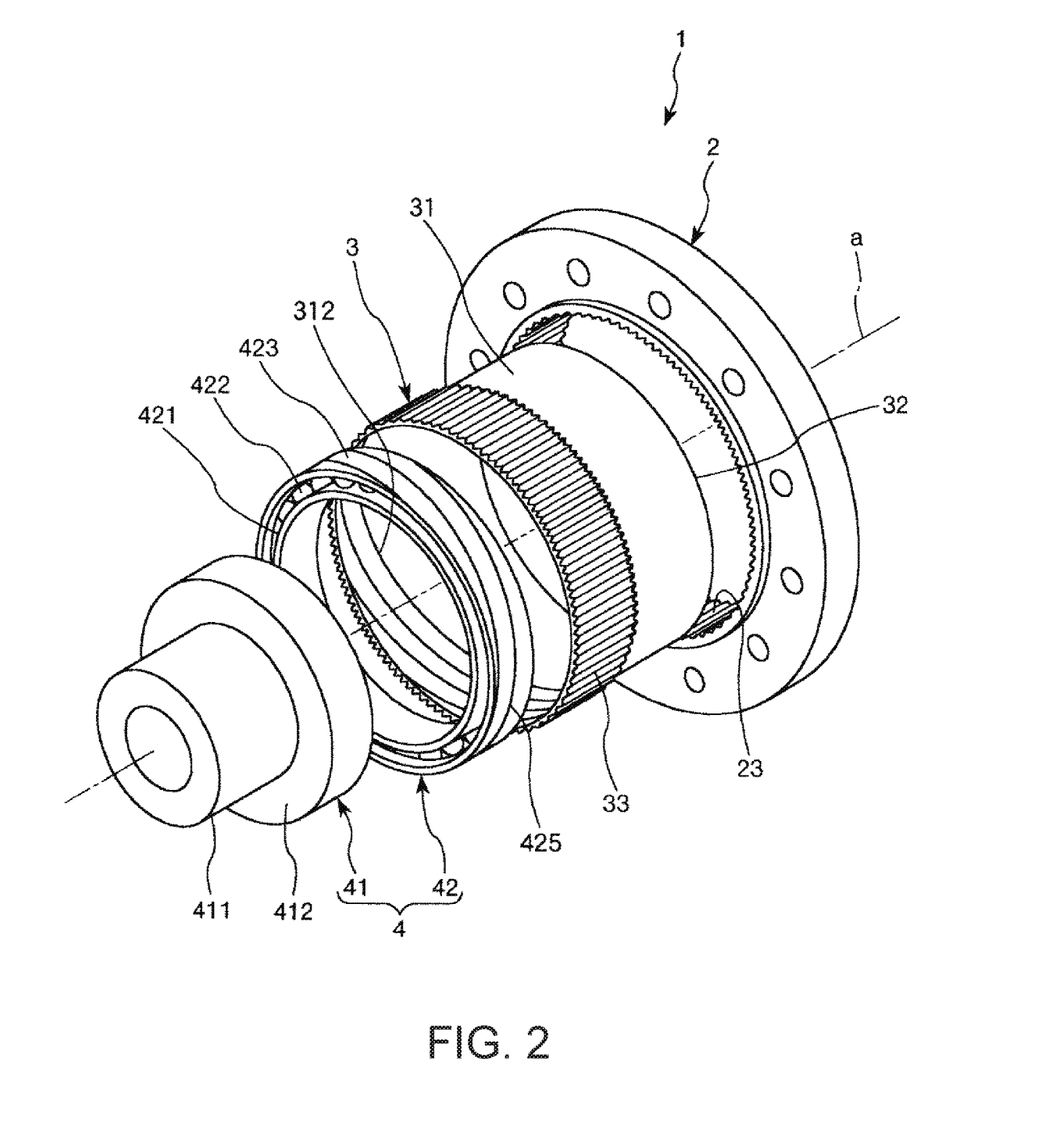
FIG. 2 is an exploded perspective view illustrating a gear device according to a first embodiment of the invention.
Figure 3:
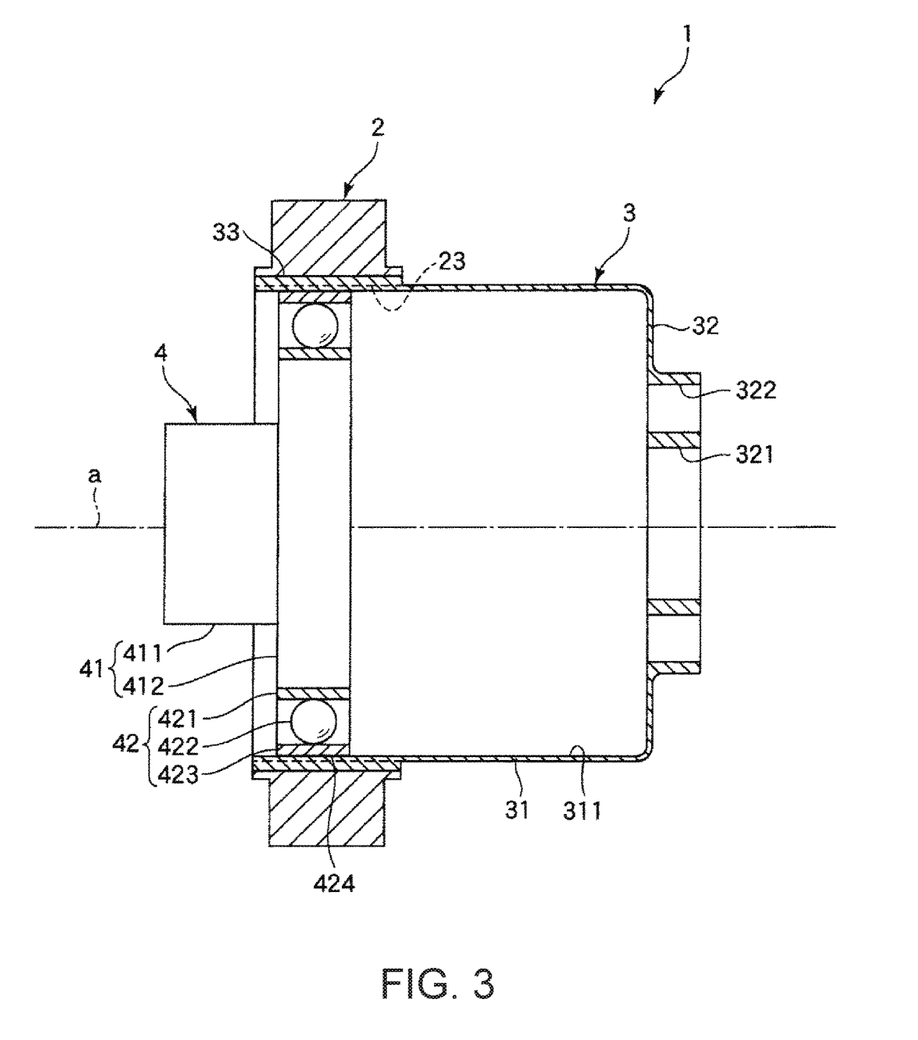
FIG. 3 is a longitudinal sectional view of the gear device illustrated in FIG. 2.
Figure 4:
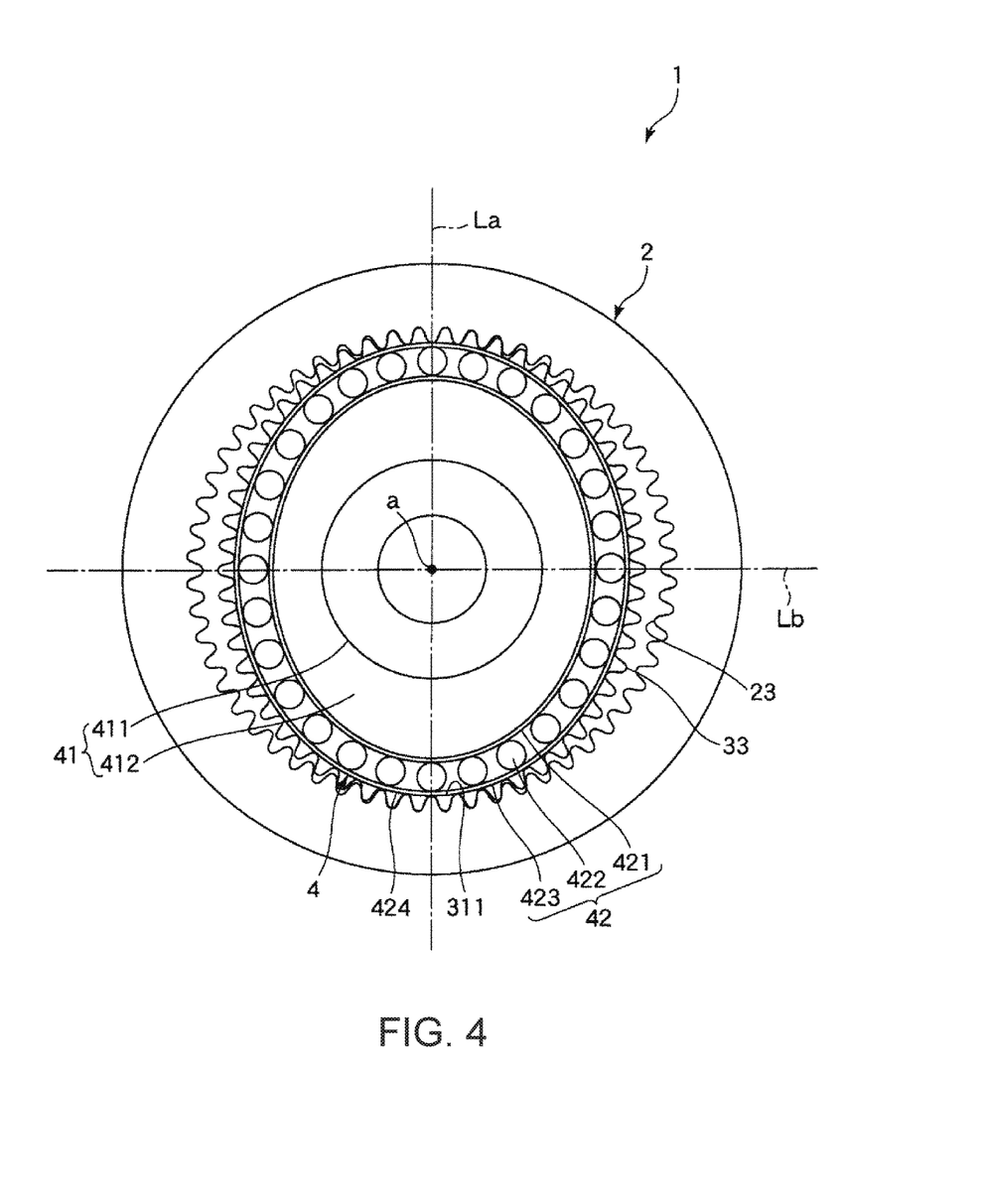
FIG. 4 is a front view of the gear device illustrated in FIG. 2.

FIG. 2 is an exploded perspective view illustrating a gear device according to a first embodiment of the invention. FIG. 3 is a longitudinal sectional view of the gear device illustrated in FIG. 2. FIG. 4 is a front view of the gear device illustrated in FIG. 2. In each drawing, the size of each portion will be exaggeratedly illustrated as appropriate, if necessary for convenience of description, and a size ratio between respective portions does not necessarily match an actual size ratio.

The gear device 1 illustrated in FIG. 2 to FIG. 4 is a wave gear device, and is used, for example, as a decelerator. The gear device 1 has a rigid gear 2, which is an internal gear, a flexible gear 3, which is a cup-like external gear disposed on an inside of the rigid gear 2, and a wave generator 4, which is disposed on an inside of the flexible gear 3.

In the gear device 1, a cross section of the flexible gear 3 has a portion that is deformed in an oval shape or an elliptical shape by the wave generator 4, and in both end portions of this portion on along axis side, the flexible gear 3 is meshed with the rigid gear 2. The number of teeth of the rigid gear 2 and the number of teeth of the flexible gear 3 are different from each other.

In such a gear device 1, for example, when driving force (for example, driving force from the motor 150 described above) is input into the wave generator 4, the rigid gear 2 and the flexible gear 3 relatively rotate around an axis a due to a difference in the number of teeth while a position where the rigid gear and the flexible gear are meshed with each other moves in a circumferential direction. Consequently, the driving force input from the drive source in the wave generator 4 can be decelerated so as to be output from the flexible gear 3. That is, a decelerator, in which the wave generator 4 is on an input axis side and the flexible gear 3 on an output axis side, can be realized.

Hereinafter, a configuration of the gear device 1 will be briefly described.

As illustrated in FIG. 2 to FIG. 4, the rigid gear 2 is a gear that is configured of a rigid body, which practically does not deflect in a diameter direction, and is a ring-like internal gear that has internal teeth 23. In the embodiment, the rigid gear 2 is a spur gear. That is, the internal teeth 23 have tooth traces parallel to the axis a. The tooth traces of the internal teeth 23 may be inclined with respect to the axis a. That is, the rigid gear 2 may be a helical gear or a double helical gear.

The flexible gear 3 is inserted in the rigid gear 2. The flexible gear 3 is a gear having flexibility that is flexurally deformable in the diameter direction, and is an external gear that has external teeth 33 (teeth), which mesh with the internal teeth 23 of the rigid gear 2. In addition, the number of teeth of the flexible gear 3 is smaller than the number of teeth of the rigid gear 2. By the number of teeth of the flexible gear 3 and the number of teeth of the rigid gear 2 being different from each other as described above, the decelerator can be realized.

In the embodiment, the flexible gear 3 has a cup-like shape, of which one end is opened, and the external teeth 33 is formed in an end portion on an opening side of the flexible gear. Herein, the flexible gear 3 has a tubular (more specifically, cylindrical) body portion 31 (tubular portion) around the axis a and a bottom portion 32 connected to one end portion of the body portion 31 in a direction of the axis a. Consequently, an end portion of the body portion 31 on a side opposite to the bottom portion 32 can be made likely to deflect in the diameter direction. For this reason, good deflection-meshing of the flexible gear 3 with the rigid gear 2 can be realized. In addition, the rigidity of the end portion of the body portion 31 on a bottom portion 32 side can be increased. For this reason, an input axis or an output axis can be stably connected to the bottom portion 32.

In addition, as illustrated in FIG. 3, a hole 321 that is pierced along the axis a and a plurality of holes 322 that are pierced adjacent to the hole 321 are formed in the bottom portion 32. A shaft body on an output side can be inserted into the hole 321. In addition, the holes 322 can be used as screw holes into which screws for fixing the shaft body on the output side to the bottom portion 32 are inserted. The holes may be provided as appropriate, and can also be omitted.

As illustrated in FIG. 4, the wave generator 4 is disposed on the inside of the flexible gear 3, and is rotatable around the axis a. The wave generator 4 deforms a cross section of a portion on a side opposite to the bottom portion 32 of the flexible gear 3 into an oval shape or an elliptical shape having a long axis La and a short axis Lb and meshes the external teeth 33 with the internal teeth 23 of the rigid gear 2. At this time, the flexible gear 3 meshes with the rigid gear 2 inside and outside of each other so as to be rotatable around the same axis a.

In the embodiment, the wave generator 4 has a main body portion 41 and a bearing 42 mounted on an outer circumference of the main body portion 41. The main body portion 41 has a shaft portion 411 that rotates around the axis a and a cam portion 412 that protrudes from one end portion of the shaft portion 411 to the outside. At this time, an outer circumferential surface of the cam portion 412 is in an oval shape or an elliptical shape when seen in a direction along the axis a. The bearing 42 has a flexible inner ring 421 and an outer ring 423, and a plurality of balls 422 disposed between the inner ring and the outer ring. Herein, the inner ring 421 is fitted to the outer circumferential surface of the cam portion 412 of the main body portion 41, and is elastically deformed in an oval shape or an elliptical shape along the outer circumferential surface of the cam portion 412. Along with this, the outer ring 423 is also elastically deformed in an oval shape or an elliptical shape. In addition, an outer circumferential surface of the inner ring 421 and an inner circumferential surface of the outer ring 423 each have an orbital surface that turns the plurality of balls 422 while guiding the balls in the circumferential direction. In addition, although not illustrated, the plurality of balls 422 are held by a holder so as to be kept at constant intervals among one another in the circumferential direction.

In such a wave generator 4, the orientation of the cam portion 412 changes with the rotation of the main body portion 41 around the axis a. Along with this, an outer circumferential surface of the outer ring 423 deforms as well, and a position where the rigid gear 2 and the flexible gear 3 are meshed with each other is moved.

Hereinbefore, the configuration of the gear device 1 has been briefly described. In such a gear device 1, as described above, for example, when driving force (for example, driving force from the motor 150 described above) is input into the wave generator 4, the rigid gear 2 and the flexible gear 3 relatively rotate around the axis a due to a difference in the number of teeth while a position where the rigid gear and the flexible gear are meshed with each other moves in the circumferential direction. At this time, the flexible gear 3 repeatedly deforms and repeatedly comes into contact with and separates away from the wave generator 4. For this reason, a lubricant is used in order to reduce friction between the flexible gear 3 and the wave generator 4. In order to hold a lubricant in a good state in the long term, the gear device 1 has a configuration described in the following.

Figure 5:
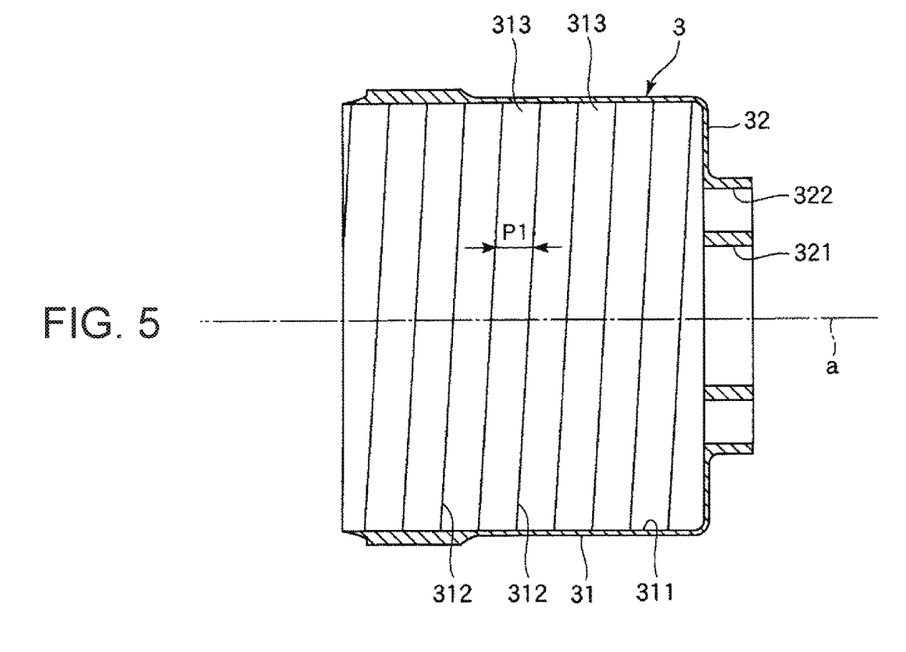
FIG. 5 is a view schematically illustrating a first recessed portion formed in an inner circumferential surface of an external gear (flexible gear) included in the gear device illustrated in FIG. 2.
Figure 6:
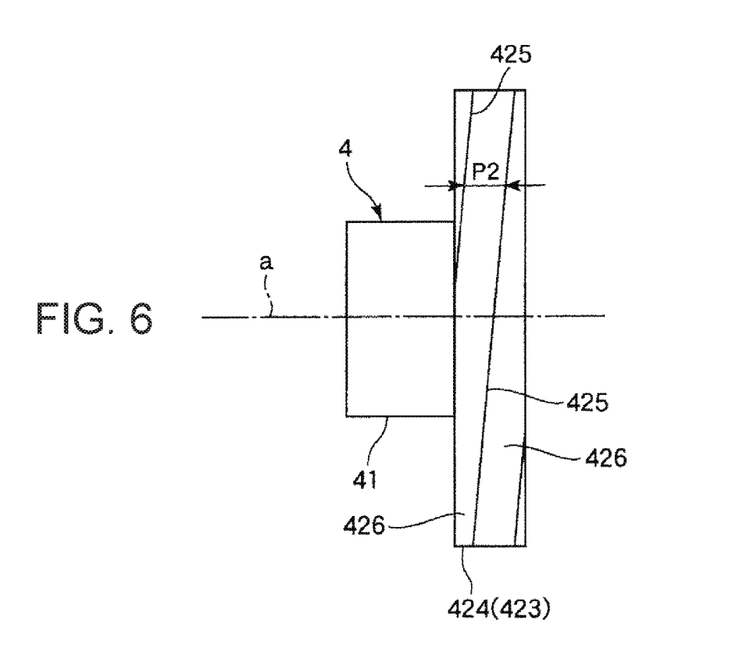
FIG. 6 is a view schematically illustrating a second recessed portion formed in an outer circumferential surface of a wave generator included in the gear device illustrated in FIG. 2.
Figure 7:
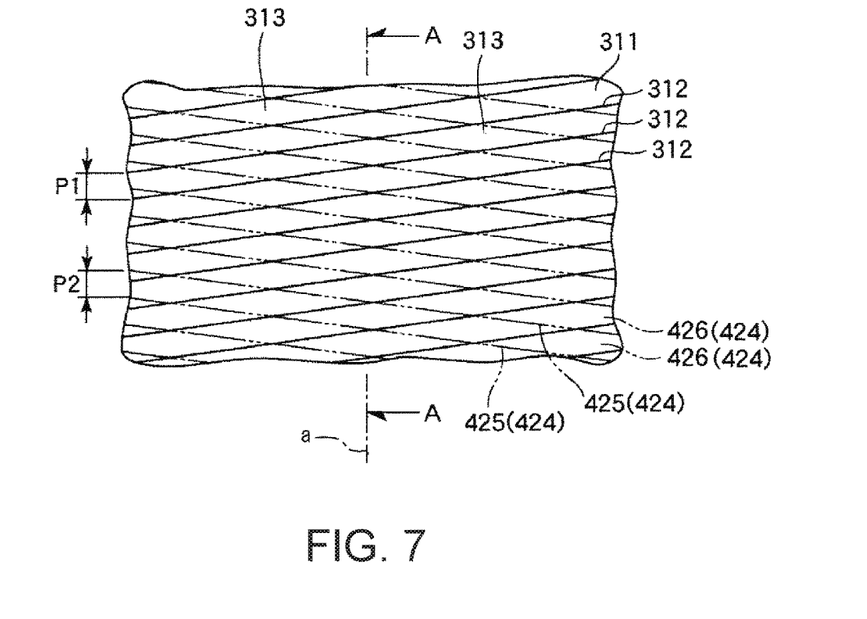
FIG. 7 is a schematic view for illustrating a state where a first uneven pattern attributable to the first recessed portion illustrated in FIG. 5 and a second uneven pattern attributable to the second recessed portion illustrated in FIG. 6 overlap each other.
Figure 8:
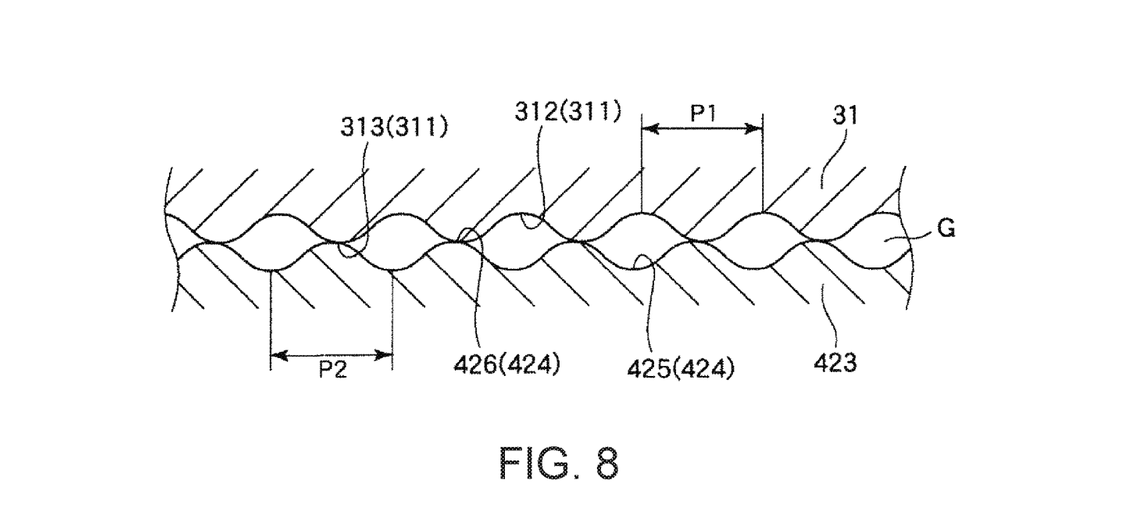
FIG. 8 is a sectional view taken along a line A-A of FIG. 7.
Figure 9:
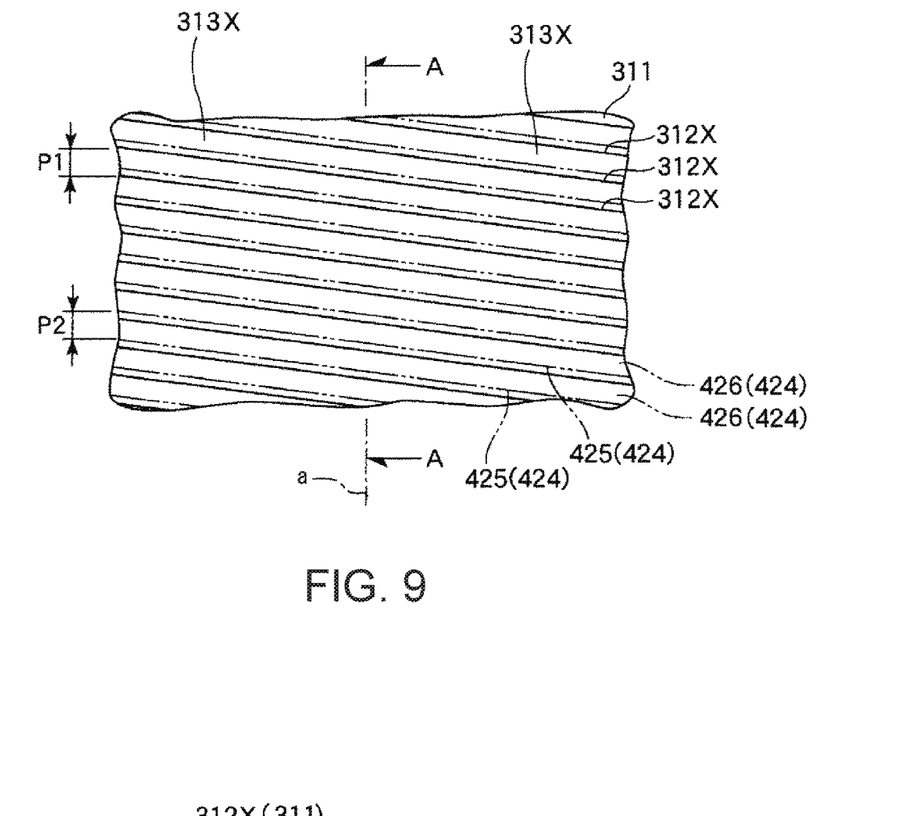
FIG. 9 is a schematic view for illustrating a state where the first uneven pattern and the second uneven pattern overlap each other in a case where the patterns are the same.

FIG. 5 is a view schematically illustrating a first recessed portion formed in an inner circumferential surface of an external gear (flexible gear) included in the gear device illustrated in FIG. 2. FIG. 6 is a view schematically illustrating a second recessed portion formed in an outer circumferential surface of a wave generator included in the gear device illustrated in FIG. 2. FIG. 7 is a schematic view for illustrating a state where a first uneven pattern attributable to the first recessed portion illustrated in FIG. 5 and a second uneven pattern attributable to the second recessed portion illustrated in FIG. 6 overlap each other. FIG. 8 is a sectional view taken along a line A-A of FIG. 7. FIG. 9 is a schematic view for illustrating a state where the first uneven pattern and the second uneven pattern overlap each other in a case where the patterns are the same. For convenience of description, FIG. 5 schematically illustrates the first recessed portion with a solid line, and similarly, FIG. 6 schematically illustrates the second recessed portion with a solid line. In addition, FIG. 7 and FIG. 9 each illustrate the first recessed portion with a solid line, and schematically illustrate the second recessed portion with a two-dot chain line. Herein, the thickness (width) of the solid line or the two-dot chain line does not indicate the width of the first recessed portion or the second recessed portion. In addition, actual pitches of the recessed portion and the projection portion are different from the illustrated pitches (the same applies to FIG. 2).

As described above, the gear device 1 has the rigid gear 2, which is the "internal gear", the flexible gear 3, which is the flexible "external gear" that partially meshes with the rigid gear 2, and the wave generator 4, which deflects the flexible gear 3 and moves a position where the rigid gear 2 and the flexible gear 3 are meshed with each other in the circumferential direction. Herein, an inner circumferential surface 311 of the flexible gear 3 and an outer circumferential surface 424 of the wave generator 4 are in a tubular shape (arc shape) around the axis a, are disposed inside and outside of each other, and are the "first surface" and the "second surface", which repeatedly come into contact with and separate away from each other with the operation of the gear device 1.

As illustrated in FIG. 5, the inner circumferential surface 311 (first surface) of the flexible gear 3 has first recessed portions 312 and first projection portions 313, which extend in a direction having a circumferential direction component around the axis a and configure the first uneven pattern by being alternately arranged in the direction along the axis a. That is, the first recessed portions 312 and the first projection portions 313 are alternately formed on the inner circumferential surface 311 along a spiral and in a direction of the axis a.

In addition, as illustrated in FIG. 6, the outer circumferential surface 424 (second surface) of the wave generator 4 has second recessed portions 425 and second projection portions 426, which extend in the direction having the circumferential direction component around the axis a and configure the second uneven pattern that is different from the first uneven pattern described above by being alternately arranged in the direction along the axis a. That is, the second recessed portions 425 and the second projection portions 426 are alternately formed along a spiral and in the direction of the axis a on the outer circumferential surface 424.

As illustrated in FIG. 7, such a first uneven pattern configured of the first recessed portions 312 and the first projection portions 313 and such a second uneven pattern configured of the second recessed portions 425 and the second projection portions 426 are different from each other. Consequently, when the inner circumferential surface 311 (first surface) of the flexible gear 3 and the outer circumferential surface 424 (second surface) of the wave generator 4 come into contact with each other, the first projection portions 313 and the second projection portions 426 come into contact with each other, and a clearance G, which is generated by the first recessed portions 312 and the second recessed portions 425 between the inner circumferential surface 311 and the outer circumferential surface 424, can be formed as illustrated in FIG. 8.

In this manner, when the inner circumferential surface 311 (first surface) of the flexible gear 3 and the outer circumferential surface 424 (second surface) of the wave generator 4 repeatedly come into contact with and separate away from each other with the operation of the gear device 1, the entry of the first projection portions 313 into the second recessed portions 425 and the entry of the second projection portions 426 into the first recessed portions 312 can be reduced. For this reason, the spill of a lubricant from the first recessed portions 312 and from the second recessed portions 425 can be reduced, and good lubricity attributable to the lubricant between the inner circumferential surface 311 (first surface) of the flexible gear 3 and the outer circumferential surface 424 (second surface) of the wave generator 4 can be maintained in the long term. As a result, the life of the gear device 1 can be lengthened.

In particular, in the gear device 1, which is the wave gear device, the inner circumferential surface (first surface) of the flexible gear 3 deforms with the rotation of the wave generator 4 and repeatedly comes into contact with and separates away from the outer circumferential surface (second surface) of the wave generator 4, as described above. Since it is necessary to make such a flexible gear 3 thin, the flexible gear is likely to be damaged when lubricity attributable to a lubricant declines. Therefore, when the configuration described above is applied to such a gear device 1, the effect described above becomes more conspicuous.

Figure 10:
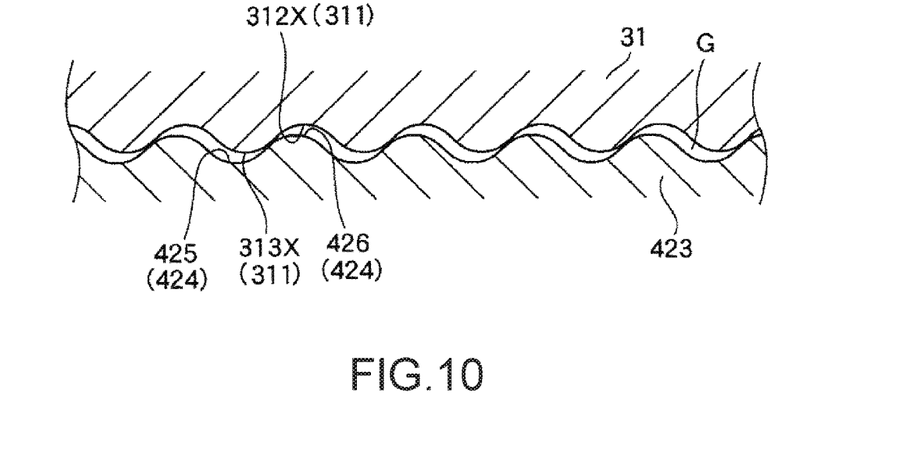
FIG. 10 is a sectional view taken along a line A-A of FIG. 9.

On the contrary, in a case where a first uneven pattern configured of first recessed portions 312X and first projection portions 313X and the second uneven pattern configured of the second recessed portions 425 and the second projection portions 426 are the same as illustrated in FIG. 9, the first projection portions 313X enter the second recessed portions 425 and the second projection portions 426 enter the first recessed portions 312X as illustrated in FIG. 10. For this reason, the clearance G formed between the inner circumferential surface 311 and the outer circumferential surface 424 becomes smaller and a lubricant spills from the first recessed portions 312X and from the second recessed portions 425.

The "first uneven pattern" is a planar pattern formed of the first recessed portions 312 and the first projection portions 313 (for example, a diagram drawn by a line segment along the recessed portions or the projection portions), and similarly, the "second uneven pattern" is a planar pattern formed of the second recessed portions 425 and the second projection portions 426. "The first uneven pattern and the second uneven pattern are different from each other" refers to the fact that the planar patterns, including the first uneven pattern and the second uneven pattern, are different from each other (patterns do not match completely), specifically refers to the fact that pitches at which the recessed portions and the projection portions are arranged are different from each other or the directions of arrangement are different from each other, and in particular refers to the fact that a complementary relationship is not established when the shape of the first uneven pattern and the shape of the second uneven pattern oppose each other.

Herein, for example, when the flexible gear 3 is manufactured with the use of machining such as turning, the first recessed portions 312 and the first projection portions 313 are formed as processing marks (for example, cutting marks) of the machining. Similarly, for example, when the wave generator 4 is manufactured with the use of machining such as turning, the second recessed portions 425 and the second projection portions 426 are also formed as processing marks (for example, cutting marks) of the machining.

Therefore, each of the first recessed portions 312 and the first projection portions 313 extends along a spiral (helical winding shape) of which the center is the axis a. Similarly, each of the second recessed portions 425 and the second projection portions 426 extends along a spiral of which the center is the axis a. In the embodiment, the orientation of the spiral, along which the first recessed portions 312 and the first projection portions 313 extend, and the orientation of the spiral, along which the second recessed portions 425 and the second projection portions 426 extend, are opposite to each other. A pitch P1 of the spiral, along which the first recessed portions 312 and the first projection portions 313 extend, and a pitch P2 of the spiral, along which the second recessed portions 425 and the second projection portions 426 extend, are the same in FIG. 9, but may be different from each other. In addition, the inclination angles of the first recessed portions 312 or the first projection portions 313 with respect to the circumferential direction and the inclination angles with respect to the second recessed portions 425 or the second projection portions 426 are the same, but may be different from each other. In addition, the recessed portions or the projection portions may be configured as a plurality of recessed portions or a plurality of projection portion, which extend in the direction having the circumferential direction component around the axis a. That is, the recessed portions or the projection portions may be formed intermittently.

As described above, the first recessed portions 312 or the first projection portions 313 have a portion extending along a spiral, and the second recessed portions 425 or the second projection portions 426 have a portion extending along a spiral in an orientation opposite to that of the first recessed portions 312 or the first projection portions 313. Consequently, the first uneven pattern and the second uneven pattern that are different from each other can be easily realized.

In addition, each of a direction, in which the first recessed portions 312 or the first projection portions 313 extend, and a direction, in which the second recessed portions 425 or the second projection portions 426 extend, includes a direction component along the axis a. In such a case, if the first projection portions 313 enter the second recessed portions 425 or the second projection portions 426 enter the first recessed portions 312, a lubricant inside the first recessed portions 312 or the second recessed portions 425 is likely to spill in the direction along the axis a and lubricity attributable to the lubricant between the inner circumferential surface 311 of the flexible gear 3 and the outer circumferential surface 424 of the wave generator 4 is impaired early. Therefore, in such a case, when the invention is applied and the entry of the first projection portions 313 into the second recessed portions 425 and the entry of the second projection portions 426 into the first recessed portions 312 are reduced, the effect becomes conspicuous. In a case where at least one of the direction, in which the first recessed portions 312 or the first projection portions 313 extend, and the direction, in which the second recessed portions 425 or the second projection portions 426 extend, includes the direction component along the axis a, the effect of the invention described above becomes conspicuous.

In particular, each of the first recessed portions 312 and the second recessed portions 425 extends along a spiral. In such a case, by reducing the entry of the first projection portions 313 into the second recessed portions 425 and the entry of the second projection portions 426 into the first recessed portions 312, there is not only the effect of reducing the spill of a lubricant from the first recessed portions 312 and from the second recessed portions 425, which is described above, but also an advantage, in which a lubricant is easily introduced between the inner circumferential surface 311 of the flexible gear 3 and the outer circumferential surface 424 of the wave generator 4 through the first recessed portions 312 or the second recessed portions 425. When at least one of the first recessed portions 312 and the second recessed portions 425 extends along a spiral, the advantage described above is obtained.

In addition, although each of the pitch P1 of the spiral, along which the first recessed portions 312 and the first projection portions 313 extend, and the pitch P2 of the spiral, along which the second recessed portions 425 and the second projection portions 426 extend, is not particularly limited, it is preferable that the pitches, for example, are equal to or larger than 0.1 µm and are equal to or smaller than 100 µm, and it is more preferable that the pitches are equal to or larger than 10 µm and are equal to or smaller than 50 µm. Consequently, a lubricant can be suitably held inside the first recessed portions 312 or the second recessed portions 425 while making the size accuracy of the flexible gear 3 and the wave generator 4 excellent. Each of the pitches P1 and P2 can be expressed as an average interval (Sm) of unevenness in the direction along the axis a.

In addition, although each of the widths of the first recessed portions 312 and the widths of the second recessed portions 425 is not particularly limited, it is preferable that the widths, for example, are equal to or larger than 0.05 µm and are equal to or smaller than 50 µm, and it is more preferable that the widths are equal to or larger than 5 µm and are equal to or smaller than 25 µm. Consequently, a lubricant can be suitably held inside the first recessed portions 312 or the second recessed portions 425 while making the size accuracy of the flexible gear 3 and the wave generator 4 excellent. Each of such widths can be expressed as arithmetic average roughness (Ra) in the direction along the axis a.

In addition, it is preferable that each of the rigid gear 2, the flexible gear 3, and the wave generator 4 is configured of a metal, and in particular it is more preferable that an iron-based material is used since the iron-based material is excellent in mechanical properties and processability and is relatively inexpensive. Although such an iron-based material is not particularly limited, it is preferable that the material is one of, for example, cast iron, nickel-chrome-molybdenum steel, steel chromium molybdenum (SCM), maraging steel, and precipitation hardening stainless steel. Although it is also possible to configure each of the rigid gear 2 and the wave generator 4 with ceramics since the rigid gear and the wave generator are practically rigid bodies, it is preferable that a metal is used in terms of the balance of strength among the flexible gear 3, the rigid gear, and the wave generator. When a difference in the strength of the materials is excessively large, a member with a lower strength is extremely likely to wear down and as a result, the life of the gear device 1 shortens.

In addition, a lubricant disposed between the flexible gear 3 and the wave generator 4 may be any one of lubricating oil, grease, and a solid lubricant. Grease is configured so as to include base oil and a thickener. Examples of a thickener include soap-based thickeners, such as calcium soap, calcium complex soap, sodium soap, aluminum soap, lithium soap, and lithium complex soap, and non-soap-based thickeners, such as polyurea, sodium terephthalate, polytetrafluoroethylene (PTFE), organic bentonite, and silica gel. It is preferable to use lithium soap although one type of thickener, out of the above thickener types, can be used alone or in combination with two or more types of thickeners. By using lithium soap as a thickener, the shear stability of grease can be made excellent. In addition, balance between characteristics of grease, which is a lubricant, can be made excellent. In addition, examples of base oil include mineral oil (refined mineral oil), such as paraffin-based oil and naphthene-based oil, and synthetic oil, such as polyolefin oil, ester oil, and silicone oil. One type, out of the above base oil types, can be used alone or in combination with two or more types of base oil.

In addition, it is preferable that grease includes additives, such as an antioxidant, an extreme pressure agent, and a corrosion inhibitor, and solid lubricants, such as graphite, molybdenum sulfide, and polytetrafluoroethylene (PTFE), and in particular, it is preferable to include an extreme pressure agent. Consequently, even when a lubrication target portion comes into an extreme-pressure lubrication state, burning and scuffing can be effectively prevented. In particular, it is preferable that an organic molybdenum compound and a zinc dialkyldithiophosphate are used as an extreme pressure agent. By grease including an organic molybdenum compound, friction in the lubrication target portion can be effectively reduced. In particular, organic molybdenum has an extreme pressure property and an antiwear property that are equivalent to those of molybdenum disulfide, and is even excellent in oxidation stability compared to molybdenum disulfide. For this reason, the life of grease can be lengthened.

Manufacturing Method of Gear Device

Hereinafter, a manufacturing method of the gear device 1 described above will be briefly described.

Figure 11:
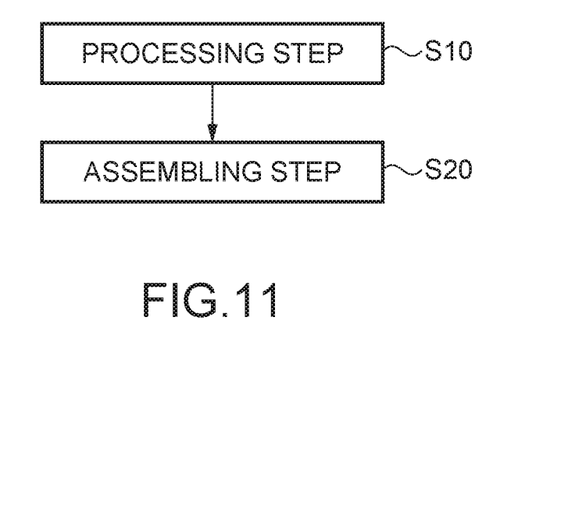
FIG. 11 is a flow chart illustrating a manufacturing method of the gear device illustrated in FIG. 2.

FIG. 11 is a flow chart illustrating a manufacturing method of the gear device illustrated in FIG. 2.

As described above, the gear device 1 has the inner circumferential surface 311, which is the tubular "first surface" and the outer circumferential surface 424, which is the tubular "second surface", both of which are disposed inside and outside of each other and repeatedly come into contact with and separate away from each other. The manufacturing method of the gear device 1 has a processing step S10 and an assembling step S20 as shown in FIG. 11. In the processing step S10, the inner circumferential surface 311 and the outer circumferential surface 424 described above are formed. That is, in the processing step S10, the inner circumferential surface 311 (first surface) that has the first recessed portions 312 and the first projection portions 313, which extend in the direction having the circumferential direction component around the axis a, which is a first axis, and configure a first uneven pattern, by being alternately arranged in the direction along the axis a and the outer circumferential surface 424 (second surface) that has the second recessed portions 425 and the second projection portions 426, which extend in the direction having the circumferential direction component around the axis a, which is a second axis, and configure a second uneven pattern that is different from the first uneven pattern, by being alternately arranged in the direction along the axis a are formed. After then, in the assembling step S20, the outer circumferential surface 424 is inserted into the inner circumferential surface 311, and the inner circumferential surface 311 and the outer circumferential surface 424 are disposed inside and outside of each other. According to such a manufacturing method of the gear device 1, the gear device 1 with a long life described above, can be manufactured.

Herein, in the processing step S10, the inner circumferential surface 311 and the outer circumferential surface 424 can be formed with the use of machining, such as turning, and the first recessed portions 312, the first projection portions 313, the second recessed portions 425, and the second projection portions 426 can be formed so as to have desired pitches and orientations by setting, for example, a feed speed, a rotation speed, and a rotation direction of turning as appropriate.

Second Embodiment

Next, a second embodiment of the invention will be described.

Figure 12:
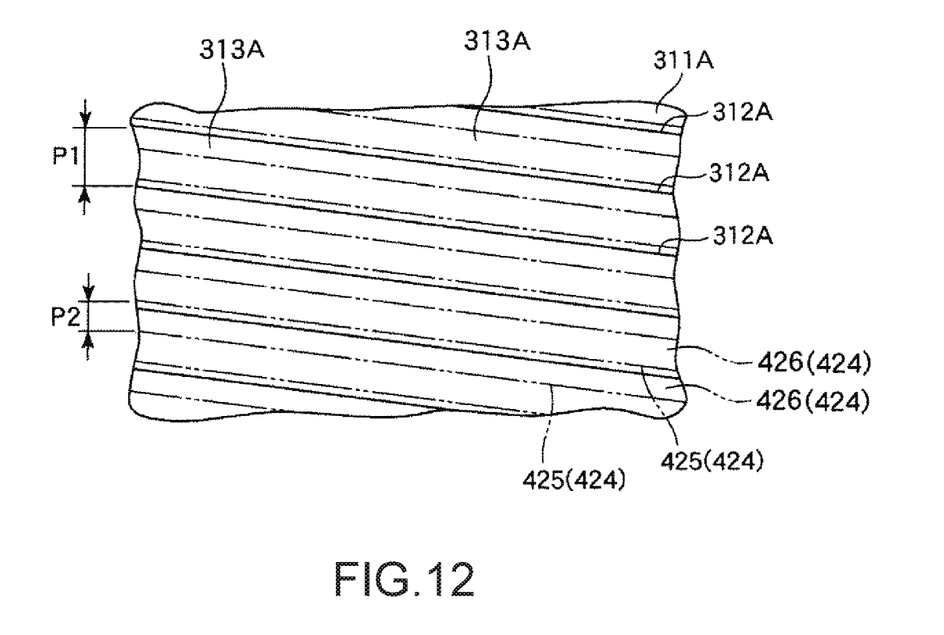
FIG. 12 is a schematic view for illustrating a state where a first uneven pattern and a second uneven pattern overlap each other in a gear device according to a second embodiment of the invention.

FIG. 12 is a schematic view for illustrating a state where a first uneven pattern and a second uneven pattern overlap each other in a gear device according to the second embodiment of the invention.

In the following description, differences between this embodiment and the embodiment described above will be mainly described, and the description of the same facts will be omitted.

In the gear device of the embodiment, an inner circumferential surface 311A, which is a "first surface", has first recessed portions 312A and first projection portions 313A. The orientation of a spiral, along which the first recessed portions 312A and the first projection portions 313A extend, is the same as the orientation of the spiral, along which the second recessed portions 425 and the second projection portions 426 extend, but the pitch P1 of the spiral, along which the first recessed portions 312A and the first projection portions 313A extend, is different from the pitch P2 of the spiral, along which the second recessed portions 425 and the second projection portions 426 extend. Herein, it is preferable that the pitches P1 and P2 are not in a relationship of being integer multiples of each other. In FIG. 12, the pitch P1 is larger than the pitch P2. Consequently, a first uneven pattern configured of the first recessed portions 312A and the first projection portions 313A and the second uneven pattern configured of the second recessed portions 425 and the second projection portions 426 are different from each other.

As described above, the first recessed portions 312A or the first projection portions 313A have a portion extending along the spiral having the pitch P2, which is a "first pitch", and the second recessed portions 425 or the second projection portions 426 have a portion extending along the spiral having the pitch P2, which is a "second pitch" and is different from the pitch P1. Consequently, the first uneven pattern and the second uneven pattern that are different from each other can be easily realized.

Also in the second embodiment described above, the life of the gear device can be lengthened.

Third Embodiment

Next, a third embodiment of the invention will be described.

Figure 13:
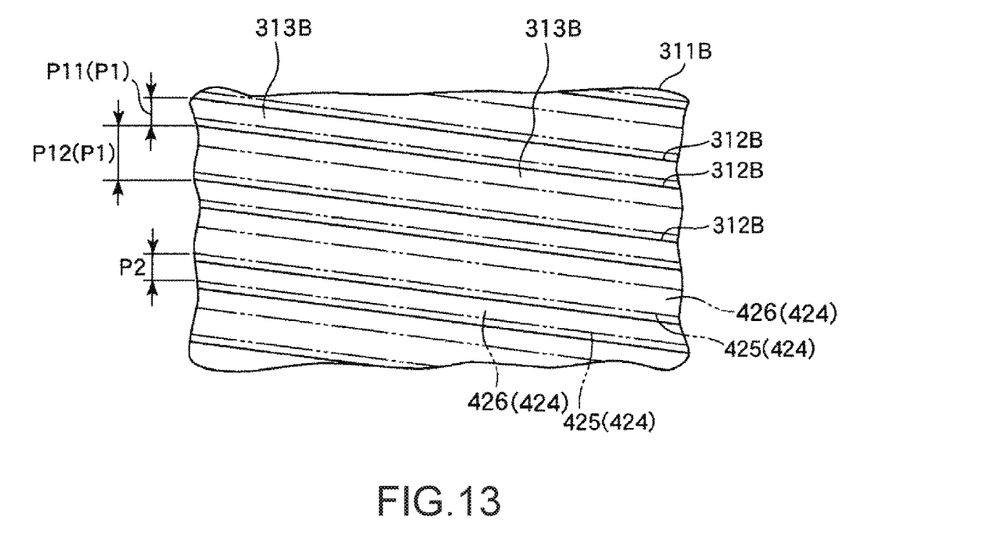
FIG. 13 is a schematic view for illustrating a state where a first uneven pattern and a second uneven pattern overlap each other in a gear device according to a third embodiment of the invention.

FIG. 13 is a schematic view for illustrating a state where a first uneven pattern and a second uneven pattern overlap each other in a gear device according to the third embodiment of the invention.

In the following description, differences between this embodiment and the embodiment described above will be mainly described, and the description of the same facts will be omitted.

In the gear device of the embodiment, an inner circumferential surface 311B, which is a "first surface", has first recessed portions 312B and first projection portions 313B. The orientation of a spiral, along which the first recessed portions 312B and the first projection portions 313B extend, is the same as the orientation of the spiral, along which the second recessed portions 425 and the second projection portions 426 extend, but the pitch P1 of the spiral, along which the first recessed portions 312B and the first projection portions 313B extend, is different from the pitch P2 of the spiral, along which the second recessed portions 425 and the second projection portions 426 extend. In particular, in the embodiment, the pitch P1 has a portion in which the pitch changes in the middle. In FIG. 13, the pitch P1 has pitches P11 and P12 that are different from each other. The pitch P1 may change continuously, may change step by step, or may change such that different pitches are repeated.

Also in the third embodiment described above, the life of the gear device can be lengthened.

Fourth Embodiment

Next, a fourth embodiment of the invention will be described.

Figure 14:
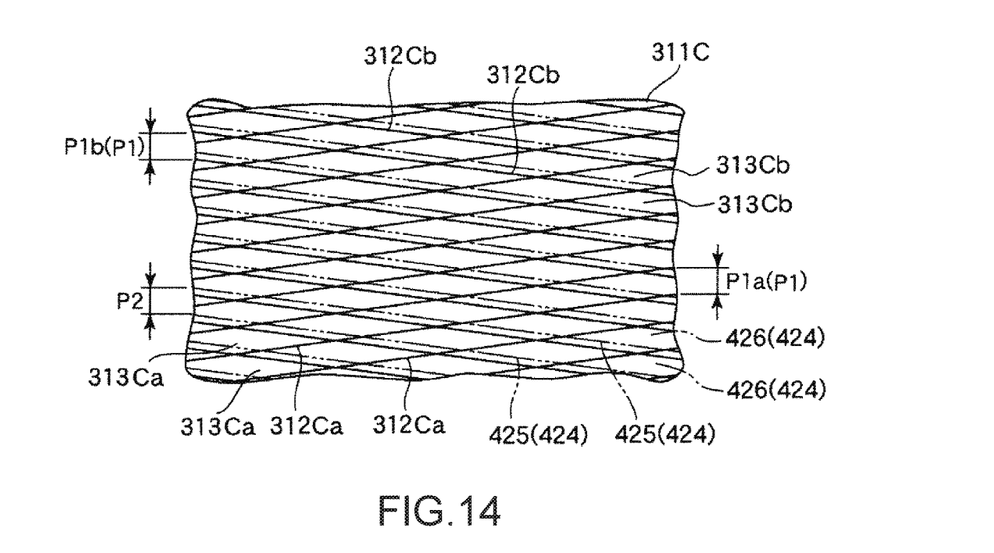
FIG. 14 is a schematic view for illustrating a state where a first uneven pattern and a second uneven pattern overlap each other in a gear device according to a fourth embodiment of the invention.

FIG. 14 is a schematic view for illustrating a state where a first uneven pattern and a second uneven pattern overlap each other in a gear device according to the fourth embodiment of the invention.

In the following description, differences between this embodiment and the embodiment described above will be mainly described, and the description of the same facts will be omitted.

In the gear device of the embodiment, an inner circumferential surface 311C, which is a "first surface", has first recessed portions 312Ca and Cb and first projection portions 313Ca and Cb that form a mesh shape. The orientation of a spiral, along which the first recessed portions 312Cb and the first projection portions 313Cb extend, is the same as the orientation of the spiral, along which the second recessed portions 425 and the second projection portions 426 extend, but the orientation of a spiral, along which the first recessed portions 312Ca and the first projection portions 313Ca extend, is different from the orientation of the spiral, along which the second recessed portions 425 and the second projection portions 426 extend. That is, the first recessed portions 312Ca and the first projection portions 313Ca, which extend along the spiral, and the first recessed portions 312Cb and the first projection portions 313Cb, which extend along the spiral in an orientation opposite to that of the first recessed portions 312Ca and the first projection portions 313Ca and are orthogonal to the first recessed portions 312Ca and the first projection portions 313Ca, are formed on the inner circumferential surface 311C. Such first recessed portions 312Ca and Cb and first projection portions 313Ca and Cb can be obtained by honing the inner circumferential surface 311C.

Herein, it is preferable that a pitch P1a of the spiral, along which the first recessed portions 312Ca and the first projection portions 313Ca extend, is the same as in the first embodiment described above, and it is preferable that a pitch P1b of the spiral, along which the first recessed portions 312Cb and the first projection portions 313Cb extend, is different from the pitch P2 of the spiral, along which the second recessed portions 425 and the second projection portions 426 extend, as in the second and third embodiments described above.

Also in the fourth embodiment described above, the life of the gear device can be lengthened. As in the inner circumferential surface 311C, mesh-like recessed portions or projection portions may be provided on the outer circumferential surface 424.

Hereinbefore, although the robot, the gear device, and the manufacturing method of a gear device according to the invention have been described based on the embodiments illustrated in the drawings, the invention is not limited thereto, and the configuration of each portion can be replaced with any configuration having the same function. In addition, any other configuration elements maybe added to the invention. In addition, each embodiment may be combined as appropriate.

Although it has been described that the robot includes the base, which is the "first member", the first arm, which is the "second member", and the gear device transmitting driving force from the first member to the second member in the embodiments described above, the invention is not limited thereto. The invention also is applicable when an nth (n is an integer that is equal to or larger than 1) arm is the "first member", an (n+1)th arm is the "second member", and a gear device transmits driving force from one of the nth arm and the (n+1)th arm to the other. In addition, the invention is applicable to a gear device transmitting driving force from the second member to the first member.

In addition, although the six-axis vertical multi-joint robot has been described in the embodiments described above, the invention is not limited thereto insofar as a gear device having a flexible gear is used. For example, a robot can have any number of joints and the invention is also applicable to a horizontal multi-joint robot.

In addition, the invention is not limited to the wave gear device of the embodiments described above and is applicable to various types of gear devices having a first surface and a second surface, which are disposed inside and outside of each other and repeatedly come into contact with and separate away from each other with operation.

The entire disclosure of Japanese Patent Application No. 2016-184663, filed Sep. 21, 2016 is expressly incorporated by reference herein.

What is claimed is:

1. A robot comprising:
   a first member;
   a second member that is provided so as to be movable around the first member; and
   a gear device that transmits driving force from one of the first member and the second member to the other,
   wherein the gear device includes
      a first surface and a second surface that are in a tubular shape around an axis, are disposed inside and outside of each other, and repeatedly come into contact with and separate away from each other with operation of the gear device,
   the first surface has a first recessed portion and a first projection portion that extend in a direction having a circumferential direction component around the axis and configure a first uneven pattern by being alternately arranged in a direction along the axis, and
   the second surface has a second recessed portion and a second projection portion that extend in the direction having the circumferential direction component around the axis and configure a second uneven pattern, which is different from the first uneven pattern, by being alternately arranged in the direction along the axis.

2. The robot according to claim 1,
   wherein at least one of a direction in which the first recessed portion or the first projection portion extends and a direction in which the second recessed portion or the second projection portion extends includes a direction component along the axis.

3. The robot according to claim 1,
   wherein at least one of the first recessed portion and the second recessed portion extends along a spiral.

4. The robot according to claim 1,
   wherein the gear device includes
      an internal gear,
      a flexible external gear that partially meshes with the internal gear, and
      a wave generator that deflects the external gear and moves a position where the internal gear and the external gear are meshed with each other in a circumferential direction,
   an inner circumferential surface of the external gear is the first surface, and
   an outer circumferential surface of the wave generator is the second surface.

5. A gear device comprising:
   a first surface and a second surface that are in a tubular shape around an axis, are disposed inside and outside of each other, and repeatedly come into contact with and separate away from each other with operation,
   wherein the first surface has a first recessed portion and a first projection portion that extend in a direction having a circumferential direction component around the axis and configure a first uneven pattern by being alternately arranged in a direction along the axis, and
   the second surface has a second recessed portion and a second projection portion that extend in the direction having the circumferential direction component around the axis and configure a second uneven pattern, which is different from the first uneven pattern, by being alternately arranged in the direction along the axis.

6. The gear device according to claim 5,
   wherein the first recessed portion or the first projection portion has a portion extending along a spiral having a first pitch, and
   the second recessed portion or the second projection portion has a portion extending along a spiral having a second pitch, which is different from the first pitch.

7. The gear device according to claim 5,
   wherein the first recessed portion or the first projection portion has a portion extending along a spiral, and
   the second recessed portion or the second projection portion has a portion extending along a spiral in an orientation opposite to the orientation of the first recessed portion or the first projection portion.

8. A manufacturing method of a gear device that includes a tubular first surface and a tubular second surface which are disposed inside and outside of each other and repeatedly come into contact with and separate away from each other with operation, the method comprising:
   forming the first surface that has a first recessed portion and a first projection portion, which extend in a direction having a circumferential direction component around a first axis and configure a first uneven pattern, by being alternately arranged in a direction along the first axis, and the second surface that has a second recessed portion and a second projection portion, which extend in a direction having a circumferential direction component around a second axis and configure a second uneven pattern that is different from the first uneven pattern, by being alternately arranged in a direction along the second axis; and
   disposing the first surface and the second surface inside and outside of each other.

* * * * *